(12) United States Patent
Sugita et al.

(10) Patent No.: US 6,350,540 B1
(45) Date of Patent: Feb. 26, 2002

(54) FUEL CELL WITH GAS DIFFUSION LAYER FLOW PASSAGE

(75) Inventors: Narutoshi Sugita, Utsunomiya; Tsugio Ohba, Asaka; Noboru Okada, Urawa, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,058

(22) Filed: Sep. 23, 1999

(30) Foreign Application Priority Data

Oct. 1, 1998 (JP) .......................... 10-280283

(51) Int. Cl.[7] .......................... H01M 6/00; H01M 8/10
(52) U.S. Cl. .......................... 429/39; 429/34; 429/38
(58) Field of Search .......................... 429/30, 34, 38, 429/39

(56) References Cited

U.S. PATENT DOCUMENTS 5,641,586 A * 6/1997 Wilson .......................... 429/30
5,691,075 A * 11/1997 Batawi .......................... 429/32
5,840,438 A * 11/1998 Johnson .......................... 429/30
6,048,633 A * 4/2000 Fuji .......................... 429/32
6,179,844 B1 * 1/2001 Kawasaki .......................... 29/623.1
6,207,312 B1 * 3/2001 Wynne .......................... 429/34

FOREIGN PATENT DOCUMENTS

| JP | 6-138575 | * 1/1996 | ............ H04M/4/86 |
| JP | 8-203546 | 8/1996 | ............ H01M/8/02 |
| WO | WO 97/08766 | * 3/1997 | ............ H01M/8/02 |

* cited by examiner

*Primary Examiner*—Gabrielle Brouillette
*Assistant Examiner*—Mark Ruthkosky
(74) *Attorney, Agent, or Firm*—Lahive & Cockfield, LLP

(57) ABSTRACT

A first gas diffusion layer for constructing an anode electrode and a second gas diffusion layer for constructing a cathode electrode are provided with first and second gas flow passages which are formed opposingly to first and second flow passages provided on first and second separators respectively. A fuel gas is supplied to the first flow passage and the first gas flow passage, while an oxygen-containing gas is supplied to the second flow passage and the second gas flow passage. Accordingly, the fuel gas and the oxygen-containing gas are uniformly diffused and supplied to first and second electrode catalyst layers respectively.

5 Claims, 7 Drawing Sheets

FUEL CELL WITH GAS DIFFUSION LAYER FLOW PASSAGE

BACKGROUND OF THE INVENTION

1. Field of the Invention

The present invention relates to a fuel cell comprising fuel cell units each of which is interposed by separators.

2. Description of the Related Art

A solid polymer fuel cell is known, which is designed, for example, as a fuel cell stack comprising fuel cell units each of which includes an electrolyte composed of a polymer ion exchange membrane (cation exchange membrane), an anode electrode, and a cathode electrode, the electrodes being arranged on both sides of the electrolyte respectively, and the fuel cell units being interposed by separators.

Such a fuel cell is operated as follows. That is, the fuel gas, for example, hydrogen-containing gas, which is supplied to the anode electrode, is converted into hydrogen ion on the catalyst electrode, and it is migrated toward the cathode electrode via the electrolyte which is appropriately humidified. Electrons are generated during this process, and they are extracted by an external circuit to be utilized as DC electric energy. The oxygen-containing gas, for example, oxygen gas or air is supplied to the cathode electrode. Therefore, the hydrogen ion, the electron, and the oxygen react on the cathode electrode to produce water.

The fuel cell as described above adopts a technique as disclosed, for example, in Japanese Laid-Open Patent Publication No. 8-203546, in order that the fuel gas is supplied to the anode electrode and the oxygen-containing gas is supplied to the cathode electrode.

That is, as shown in FIG. 7, an anode electrode 4 and a cathode electrode 5, each of which has a catalyst layer 2 and a gas diffusion layer 3, are provided on both sides of an ion exchange membrane 1. Separators 6, 7 are arranged at the outside of the anode electrode 4 and the cathode electrode 5. Flow passage grooves 6a, 7a for supplying the fuel gas and the oxygen-containing gas respectively are formed at flat surface portions of the separators 6, 7 to make contact with the anode electrode 4 and the cathode electrode 5 respectively.

However, the conventional technique described above includes lands 6b, 7b which are provided between the respective flow passage grooves 6a, 7a of the separators 6, 7. The lands 6b, 7b make tight contact with the respective gas diffusion layers 3 of the anode electrode 4 and the cathode electrode 5. Therefore, when the fuel gas and the oxygen-containing gas are supplied to the flow passage grooves 6a, 7a, the diffusion performance is deteriorated at portions of the gas diffusion layers 3 which make contact with the lands 6b, 7b. Portions 2a of the catalyst layers 2, which correspond to the lands 6b, 7b, are not utilized for the reaction.

Therefore, a problem is pointed out that the effective reaction area of the catalyst layer 2 is decreased, and the power generation performance is lowered. In view of this fact, an arrangement may be conceived, in which the effective reaction area of the catalyst layer 2 is increased by increasing the thickness of the gas diffusion layer 3. However, such an arrangement causes another problem in that the electric resistance is consequently increased, and the size of the entire fuel cell stack is increased in the stacking direction.

SUMMARY OF THE INVENTION

A principal object of the present invention is to provide a fuel cell which is suitable for realization of a miniaturized size, in which the gas diffusion performance is enhanced, and thus the effective reaction area is increased.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
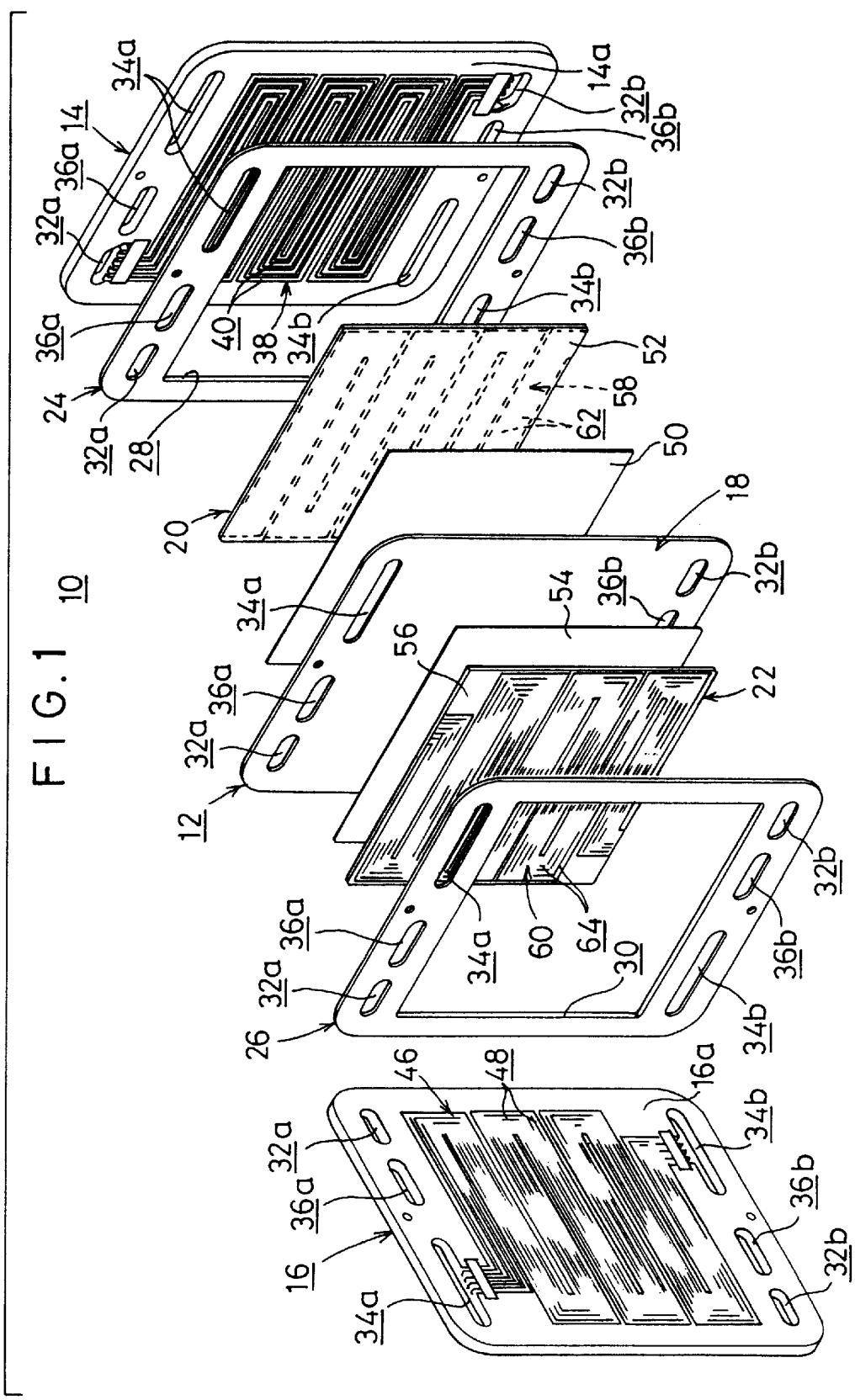
FIG. 1 shows an illustrative exploded perspective view depicting principal components of a fuel cell according to a first embodiment of the present invention.
Figure 2:
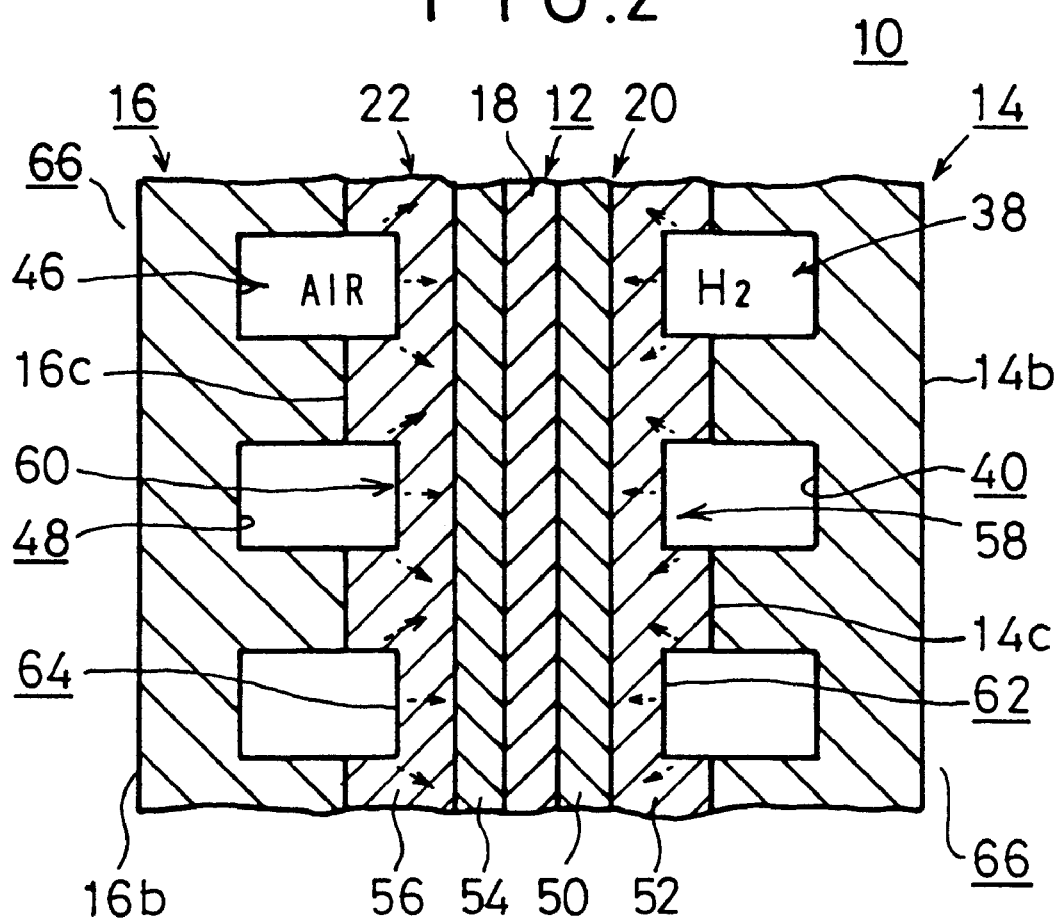
FIG. 2 shows an illustrative partial longitudinal sectional view depicting the fuel cell.

FIG. 1 shows an illustrative exploded perspective view depicting principal components of a fuel cell 10 according to a first embodiment of the present invention, and FIG. 2 shows an illustrative partial longitudinal sectional view depicting the fuel cell 10.

The fuel cell 10 comprises a fuel cell unit 12 and first and second separators 14, 16 for interposing the fuel cell unit 12. A plurality of pairs of these components are optionally stacked to construct a fuel cell stack. The fuel cell unit 12 includes a solid polymer ion exchange membrane 18, an anode electrode 20, and a cathode electrode 22, the anode electrode 20 and the cathode electrode 22 being arranged with the ion exchange membrane 18 interposed therebetween.

First and second gaskets 24, 26 are provided on both sides of the fuel cell unit 12. The first gasket 24 has a large opening 28 for accommodating the anode electrode 20 therein, while the second gasket 26 has a large opening 30 for accommodating the cathode electrode 22 therein. The fuel cell unit 12 and the first and second gaskets 24, 26 are interposed by the first and second separators 14, 16.

A fuel gas supply hole 32a, an oxygen-containing gas supply hole 34a, and a cooling water supply hole 36a are formed at upper portions of each of the first and second separators 14, 16. A fuel gas discharge hole 32b, an oxygen-containing gas discharge hole 34b, and a cooling water discharge hole 36b are formed at lower portions of each of the first and second separators 14, 16. Similarly, 15 a fuel gas supply hole 32a, an oxygen-containing gas supply hole 24a, and a cooling water supply hole 36a are formed at upper portions of each of the ion exchange membrane 18 and the first and second gaskets 24, 26. On the other hand, a fuel gas discharge hole 32b, an oxygen-containing gas 20 discharge hole 34b, and a cooling water discharge hole 36b are formed at lower portions of each of the ion exchange membrane 18 and the first and second gaskets 24, 26.

A first flow passage 38, which is used to supply the hydrogen-containing gas as the fuel gas to the anode electrode 20, is formed on a surface 14a of the first separator 14. The first flow passage 38 communicates with the fuel gas supply hole 32a formed at the upper portion of the first separator 14, and it communicates with the fuel gas discharge hole 32b formed at the lower portion of the first separator 14.

The first flow passage 38 includes, for example, six flow passage grooves 40 which are independent from each other. Each of the flow passage grooves 40 is provided in the direction of gravity while meandering in the right and left directions from the fuel gas supply hole 32a. The flow passage grooves 40 communicate with the fuel gas discharge hole 32b respectively.

A second flow passage 46, which is used to supply the air (or oxygen gas) as the oxygen-containing gas to the cathode electrode 22, is formed on a surface 16a of the second separator 16. The second flow passage 46 includes six flow passage grooves 48 in the same manner as the first flow passage 38. Each of the flow passage grooves 48 is provided in the direction of gravity while meandering in the right and left directions. The flow passage grooves 48 communicate at their both ends with the oxygen-containing gas supply hole 34a on the gas inlet side and with the oxygen-containing gas discharge hole 34b on the gas outlet side.

As shown in FIGS. 1 and 2, the anode electrode 20 includes a first electrode catalyst layer 50 which is provided on a first surface portion of the ion exchange membrane 18, and a first gas diffusion layer 52 which is provided on the first electrode catalyst layer 50. On the other hand, the cathode electrode 22 includes a second electrode catalyst layer 54 which is provided on a second surface portion of the ion exchange membrane 18, and a second gas diffusion layer 56 which is provided on the second electrode catalyst layer 54. Each of the first and second gas diffusion layers 52, 56 is made of, for example, carbon paper or porous carbon.

The first and second gas diffusion layers 52, 56 include first and second gas flow passages 58, 60 which are provided on their surface portions opposing to the first and second separators 14, 16 for allowing the hydrogen-containing gas and the air to flow therethrough respectively. The first gas flow passage 58 has the same shape as that of the first flow passage 38 which is provided on the first separator 14. The first gas flow passage 58 includes six flow passage grooves 62 which are independent from each other opposing to the respective flow passage grooves 40 of the first flow passage 38. The second gas flow passage 60 has the same shape as that of the second flow passage 46 which is provided on the second separator 16. The second gas flow passage 60 includes six flow passage grooves 64 which are independent from each other opposing to the respective flow passage grooves 48 of the second flow passage 46. Each of the flow passage grooves 62, 64 is formed by making cutout up to a predetermined depth in the thickness direction of the first and second gas diffusion layers 52, 56, and it is provided in the direction of gravity while meandering in the right and left directions.

A cooling water flow passage 66, which makes communication between the cooling water supply hole 36a and the cooling water discharge hole 36b, is formed on a side of a surface 14b, 16b of each of the first and second separators 14, 16.

Explanation will be made below for the operation of the fuel cell 10 according to the first embodiment constructed as described above.

For example, the hydrogen-containing gas is supplied as the fuel gas from the fuel gas supply hole 32a provided at the upper portion of the first separator 14 to the first flow passage 32. For example, the air (or the oxygen gas) is supplied as the oxygen-containing gas from the oxygen-containing gas supply hole 34a provided at the upper portion of the second separator 16 to the second flow passage 46.

The hydrogen-containing gas, which is supplied to the first flow passage 38, is introduced into the respective flow passage grooves 40 which are provided independently from each other, and it is supplied to the anode electrode 20 of the fuel cell unit 12 while being moved in the direction of gravity in the meandering manner in the right and left directions. On the other hand, the air, which is introduced into the second flow passage 46, is moved in the same manner as described above in the direction of gravity while meandering in the right and left directions along the respective flow passage grooves 48 which are provided independently from each other. The air is supplied to the cathode electrode 22 which constructs the fuel cell unit 12.

In the arrangement according to the first embodiment, the first and second gas diffusion layers 52, 56 are provided with the first and second gas flow passages 58, 60 which have the same shapes as those of the respective flow passage grooves 40, 48 of the first and second flow passages 38, 46 provided on the first and second separators 14, 16 respectively.

Accordingly, as shown in FIG. 2, the hydrogen-containing gas as the fuel gas is supplied in an integrated manner to the flow passage grooves 40 of the first flow passage 38 and to the flow passage grooves 62 of the first gas flow passage 58. The hydrogen-containing gas is diffused through the first gas diffusion layer 52, and it is supplied to the first electrode catalyst layer 50. It is noted that the flow passage grooves 62 are formed by making cutout up to the predetermined depth at the inside of the first gas diffusion layer 52. Therefore, no defective supply of the hydrogen-containing gas occurs at portions of the first electrode catalyst layer 50 corresponding to the lands 14c of the first separator 14.

Accordingly, an effect is obtained in that the diffusion performance of the hydrogen-containing gas is effectively improved for the anode electrode 20, the effective reaction area of the first electrode catalyst layer 50 is increased, and the power generation performance is improved. Therefore, it is unnecessary to construct the first gas diffusion layer 52 to have a thick thickness. The increase in electric resistance is prevented. The size of the entire fuel cell 10 in the stacking direction is effectively made short. Thus, the entire fuel cell 10 is allowed to have a miniaturized size.

On the other hand, the second gas flow passage 60 of the second gas diffusion layer 56 has the flow passage grooves 64 which are formed by making cutout up to the predetermined depth in the thickness direction in the same manner as in the first gas diffusion layer 52 described above. Therefore, the following effect is obtained. That is, the gas diffusion performance is not lowered irrelevant to the lands 16c of the second separator 16. The air as the oxygen-containing gas is supplied to the entire second electrode catalyst layer 54. Thus, it is possible to increase the effective reaction area of the second electrode catalyst layer 54.

Further, each of the first and second gas flow passages 58, 60 has the six independent flow passage grooves 62, 64 in total, in which each of the flow passage grooves 62, 64 is continuous as it is. Accordingly, the reaction product water, which is produced in the first and second gas flow passages 58, 60, is smoothly discharged to the outside through the respective flow passage grooves 62, 64. Thus, an advantage is obtained in that the discharge performance is effectively improved for the reaction product water.

Figure 3:
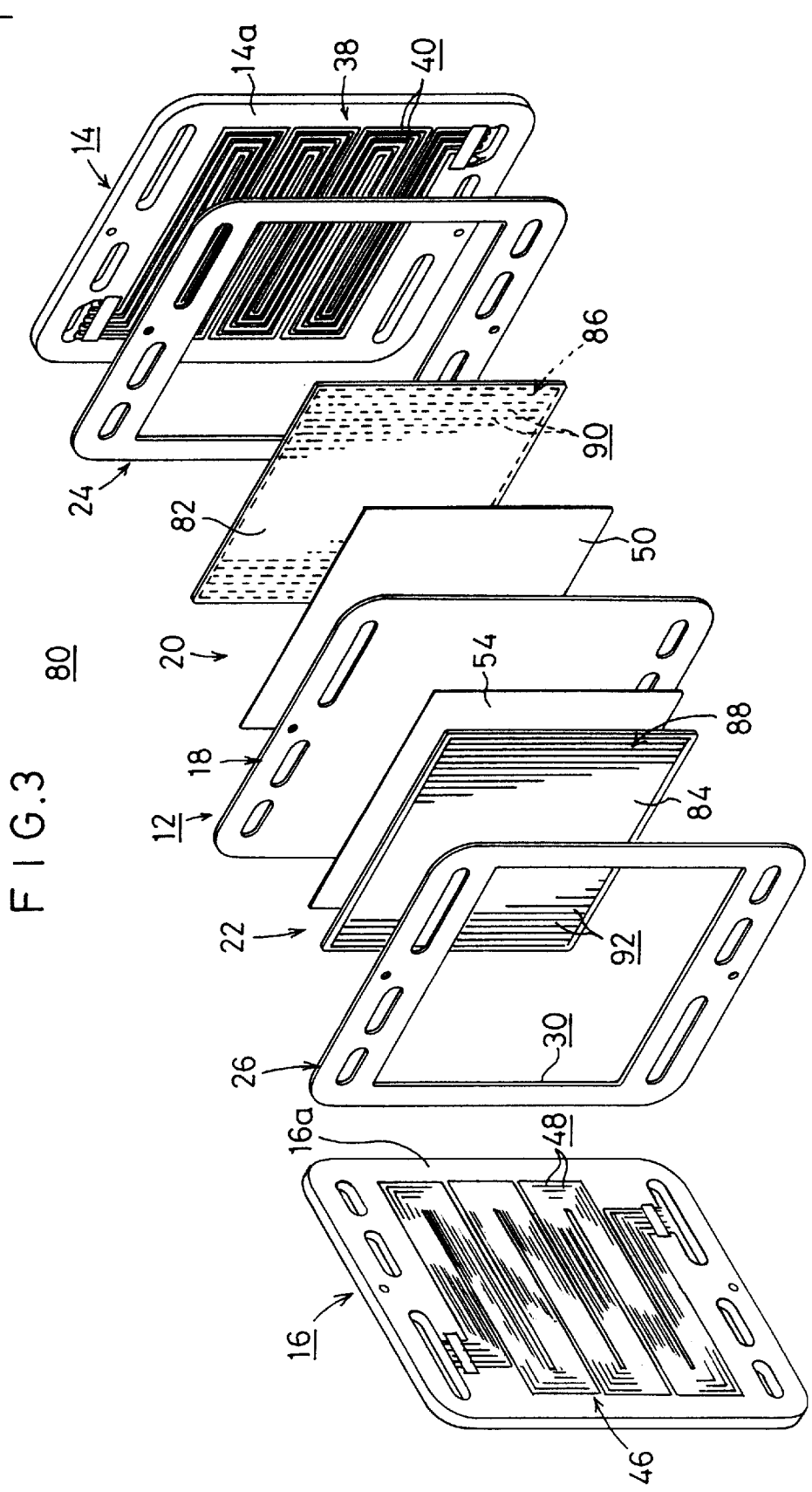
FIG. 3 shows an illustrative exploded perspective view depicting principal components of a fuel cell according to a second embodiment of the present invention.
Figure 4:
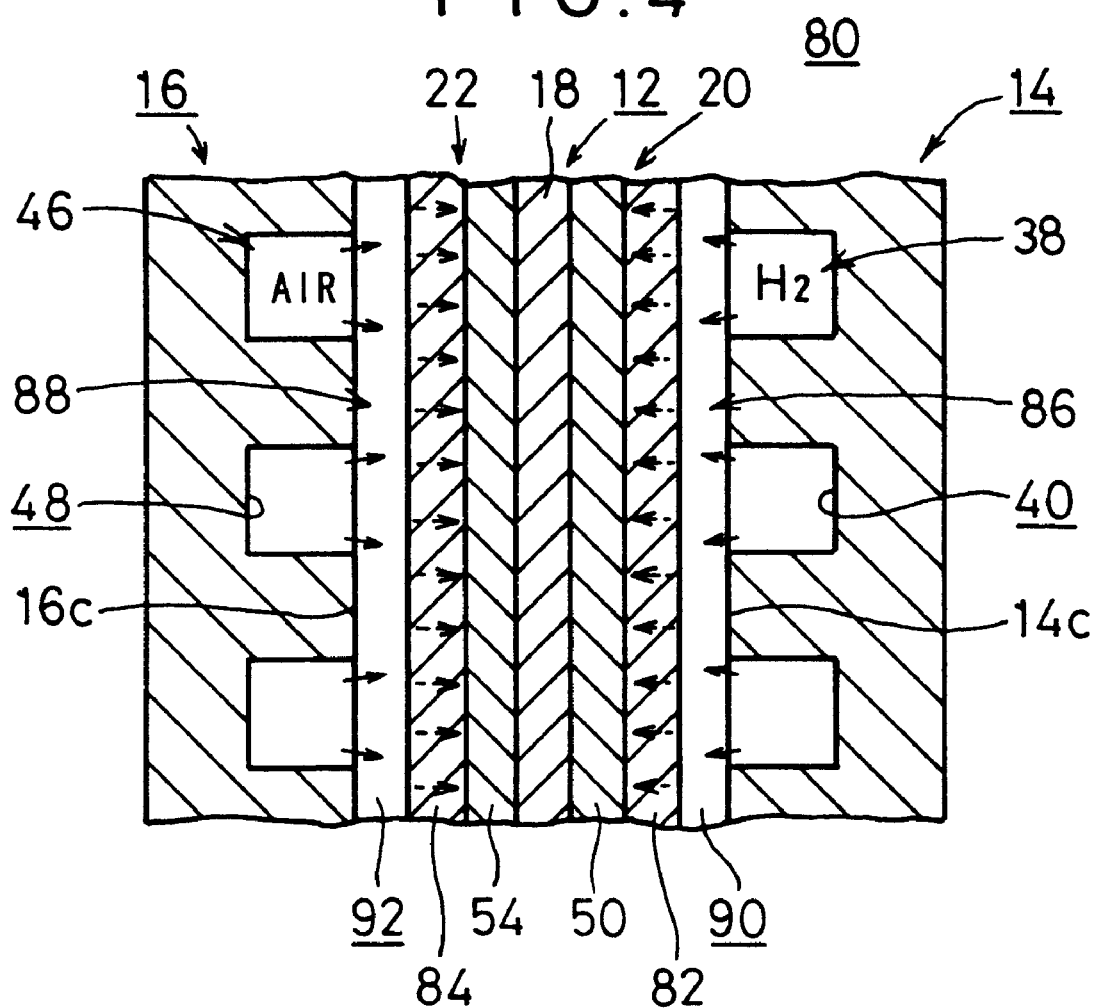
FIG. 4 shows an illustrative partial sectional view depicting the fuel cell.

FIG. 3 shows an illustrative exploded perspective view depicting principal components of a fuel cell 80 according to a second embodiment of the present invention, and FIG. 4 shows an illustrative partial sectional view depicting the fuel cell 80. The same constitutive components as those of the fuel cell 10 according to the first embodiment are designated by the same reference numerals, detailed explanation of which will be omitted.

An anode electrode 20 for constructing the fuel cell 80 includes a first gas diffusion layer 82 which is provided on a first electrode catalyst layer 50. On the other hand, a cathode electrode 22 includes a second gas diffusion layer 84 which is provided on a second electrode catalyst layer 54. The first and second gas diffusion layers 82, 84 are provided with first and second gas flow passages 86, 88 for allowing the fuel gas and the oxygen-containing gas to flow through surface portions opposing to the first and second separators 14, 16 respectively. The first and second gas flow passages 86, 88 are designed to be perpendicular to the first and second flow passages 38, 46 of the first and second separators 14, 16 respectively, and each of them includes a plurality of flow passage grooves 90, 92 which extend in the direction of gravity.

In the fuel cell 80 constructed as described above, the hydrogen-containing gas, which is introduced into the first flow passage 38, is moved in the direction of gravity while meandering in the right and left directions along the respective flow passage grooves 40. On the other hand, the hydrogen-containing gas, which is introduced into the first gas flow passage 86 communicating with the first flow passage 38, is moved in the direction of gravity along the respective flow passage grooves 90. Therefore, the hydrogen-containing gas is moved in the right and left directions and the vertical direction over the entire surface of the first gas diffusion layer 82, while the hydrogen-containing gas is diffused through the first gas diffusion layer 82, and it is supplied to the first electrode catalyst layer 50.

Accordingly, in the second embodiment, the same effect as that of the first embodiment is obtained. That is, for if example, the hydrogen-containing gas can be uniformly supplied to the entire surface of the first electrode catalyst layer 50. The gas diffusion performance is improved for the hydrogen-containing gas, and the effective reaction area of the first electrode catalyst layer 50 is successfully increased. Further, a turbulent flow of the hydrogen-containing gas is generated at portions at which the flows in the flow passage grooves 40, 90 are merged with each other. Accordingly, this embodiment is advantageous in that the gas diffusion performance is further improved for the hydrogen-containing gas.

The air as the oxygen-containing gas is supplied to the second flow passage 46, and it is moved in the direction of gravity while meandering in the right and left directions along the flow passage grooves 48. Further, the air is moved in the direction of gravity along the flow passage grooves 92 of the second gas flow passage 88. Therefore, the air can be uniformly supplied to the entire surface of the second electrode catalyst layer 54, and the power generation performance of the entire fuel cell 80 can be effectively improved.

Figure 5:
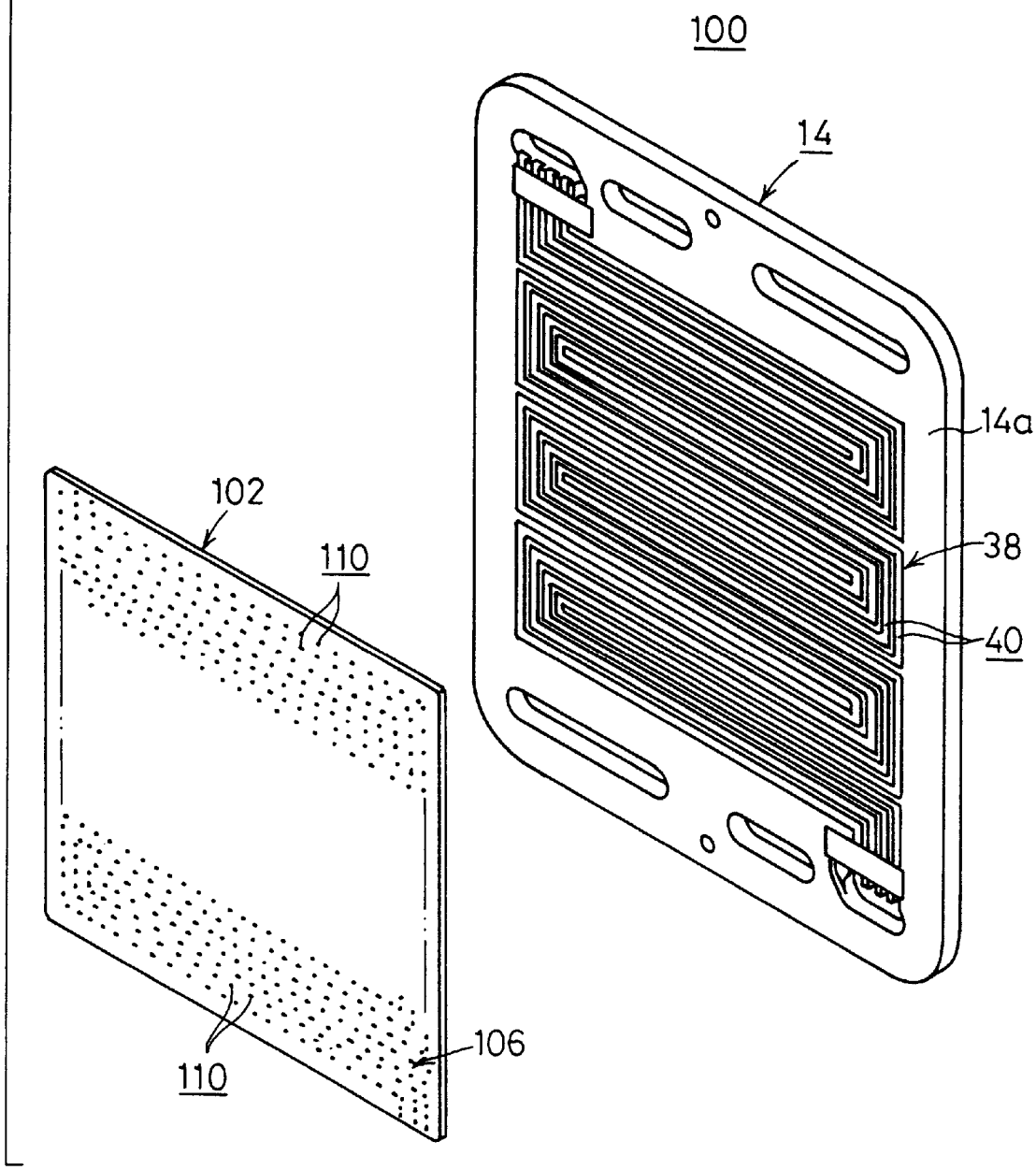
FIG. 5 shows an illustrative partial exploded perspective view depicting a fuel cell according to a third embodiment of the present invention.
Figure 6:
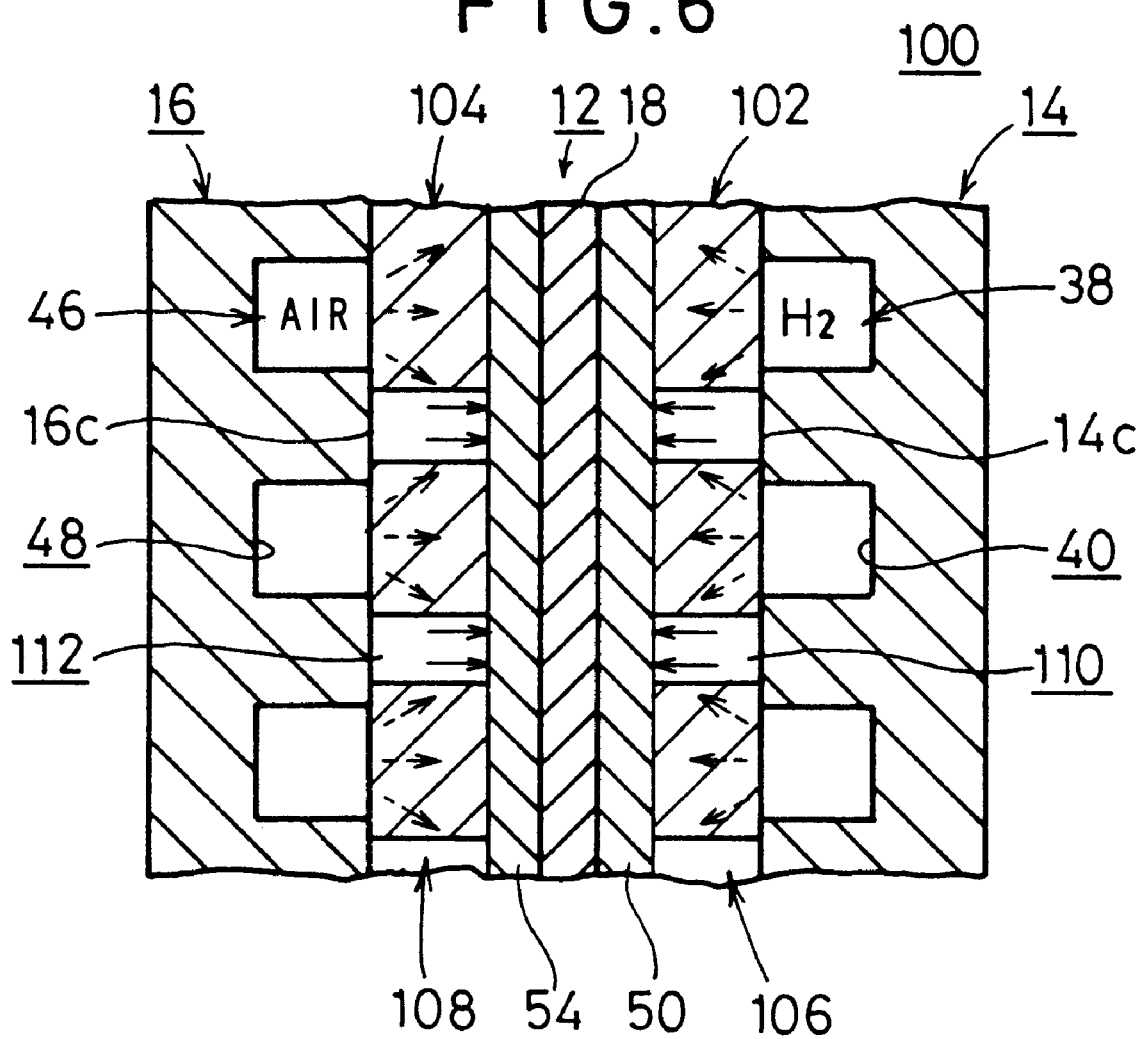
FIG. 6 shows an illustrative partial sectional view depicting the fuel cell.
Figure 7:
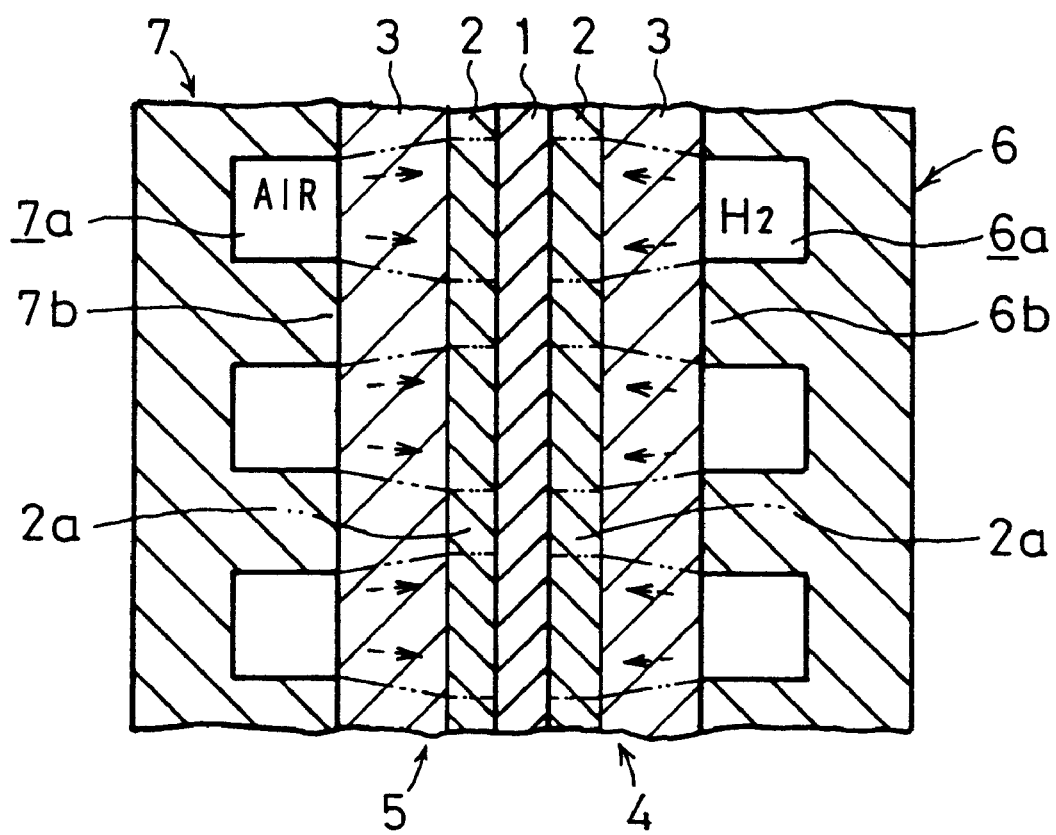
FIG. 7 shows an illustrative partial sectional view depicting a fuel cell concerning the conventional technique.

FIG. 5 shows an illustrative partial exploded perspective view depicting a fuel cell 100 according to a third embodiment of the present invention, and FIG. 6 shows an illustrative partial sectional view depicting the fuel cell 100. The same constitutive components as those of the fuel cell 10 according to the first embodiment are designated by the same reference numerals, detailed explanation of which will be omitted.

The fuel cell 100 includes first and second gas flow passages 106, 108 which are formed for a first gas diffusion layer 102 for constructing the anode electrode 20 and a second gas diffusion layer 104 for constructing the cathode electrode 22 respectively. Each of the first and second gas flow passages 106, 108 has a plurality of holes 110, 112 corresponding to the lands 14c, 16c of the first and second separators 14, 16.

The fuel cell 100 constructed as described above has the plurality of holes 110, 112 which are formed through the first and second gas diffusion layers 102, 104 corresponding to the lands 14c, 16c of the first and second separators 14, 16. Therefore, it is possible to ensure the gas diffusion performance at portions corresponding to the lands 14c, 16c.

Accordingly, the same effect as that of the first and second embodiments can be obtained. That is, for example, it is possible to increase the effective reaction area of the first and second electrode catalyst layers 50, 54.

The fuel cell according to the present invention includes the first and second separators which are provided with the first and second flow passages for supplying the fuel gas and the oxygen-containing gas respectively. The gas flow passage for allowing the fuel gas or the oxygen-containing gas to flow therethrough is provided at least on the surface portion of the gas diffusion layer opposing to the first or second separator. Thus, the gas diffusion performance can be improved, and the effective reaction area can be increased. Accordingly, it is unnecessary to make the gas diffusion layer to be thick in order to ensure the gas diffusion performance. It is possible to prevent the increase in electric resistance. Further, it is possible to reliably prevent the increase in size which would be otherwise caused in the stacking direction.

What is claimed is:

1. A fuel cell comprising:
    a fuel cell unit including an anode electrode composed of a first gas diffusion layer provided with a first electrode catalyst arranged on a first surface of an electrolyte, and a cathode electrode composed of a second gas diffusion layer provided with a second electrode catalyst arranged on a second surface of said electrolyte; and
    first and second separators provided opposingly on both sides of said fuel cell unit, wherein:
        said first separator includes a first separator flow passage for supplying fuel gas to said anode electrode;
        said second separator includes a second separator flow passage for supplying oxygen-containing gas to said cathode electrode;
        said first gas diffusion layer is provided with a first gas diffusion layer flow passage formed on at least a surface portion opposing to said first separator for allowing said fuel gas to flow therethrough;
        said second gas diffusion layer is provided with a second gas diffusion layer flow passage formed on at least a surface portion opposing to said second separator for allowing said oxygen-containing gas to flow therethrough;
        at least one of said first and said second separator flow passages is provided with a plurality of independent and continuous separator flow passage grooves; and
        said first and second gas diffusion layer flow passages have the same shape as that of at least one of said first and said second separator flow passage, and are provided with a plurality of independent and continuous gas diffusion layer flow passage grooves opposed to said separator flow passage grooves.

2. The fuel cell according to claim 1, wherein said gas diffusion layer flow passage grooves and said separator flow passage grooves are provided in a meandering pattern.

3. A fuel cell comprising:

a fuel cell unit including an anode electrode composed of a first gas diffusion layer provided with a first electrode catalyst arranged on a first surface of an electrolyte, and a cathode electrode composed of a second gas diffusion layer provided with a second electrode catalyst arranged on a second surface of said electrolyte; and first and second separators provided opposingly on both sides of said fuel cell unit, wherein;
said first separator includes a first separator flow passage for supplying fuel gas to said anode electrode;
said second separator includes a second separator flow passage for supplying oxygen-containing gas to said cathode electrode;
said first gas diffusion layer is provided with a first gas diffusion layer flow passage formed on at least a surface portion opposing to said first separator for allowing said fuel gas to flow therethrough;
said second gas diffusion layer is provided with a second gas diffusion layer flow passage formed on at least a surface portion opposing to said second separator for allowing said oxygen-containing gas to flow therethrough; and
said first and second gas diffusion layer flow passages are designed to be perpendicular to at least one of said first and said second separator flow passage.

4. The fuel cell according to claim 3, wherein:

at least one of said first and said second separator flow passage is provided with a plurality of independent and continuous separator flow passage grooves in a meandering pattern; and said first and second gas diffusion layer flow passages are provided with a plurality of gas diffusion layer flow passage grooves.

5. A fuel cell comprising:

a fuel cell unit including an anode electrode composed of a first gas diffusion layer provided with a first electrode catalyst arranged on a first surface of an electrolyte, and a cathode electrode composed of a second gas diffusion layer provided with a second electrode catalyst arranged on a second surface of said electrolyte; and first and second separators provided opposingly on both sides of said fuel cell unit, wherein:
said first separator includes a first separator flow passage for supplying fuel gas to said anode electrode;
said second separator includes a second separator flow passage for supplying oxygen-containing gas to said cathode electrode:
said first gas diffusion layer is provided with a first gas diffusion layer flow passage formed on at least a surface portion opposing to said first separator for allowing said fuel gas to flow therethrough;
said second gas diffusion layer is provided with a second gas diffusion layer flow passage formed on at least a surface portion opposing to said second separator for allowing said oxygen-containing gas to flow therethrough;
at least said first or second separator flow passage is provided with a plurality of independent and continuous separator flow passage grooves; and
said gas diffusion layer flow passages are provided with a plurality of holes which are formed in positions corresponding to land portions disposed between said flow passage grooves.

* * * * *